Patented Mar. 31, 1931

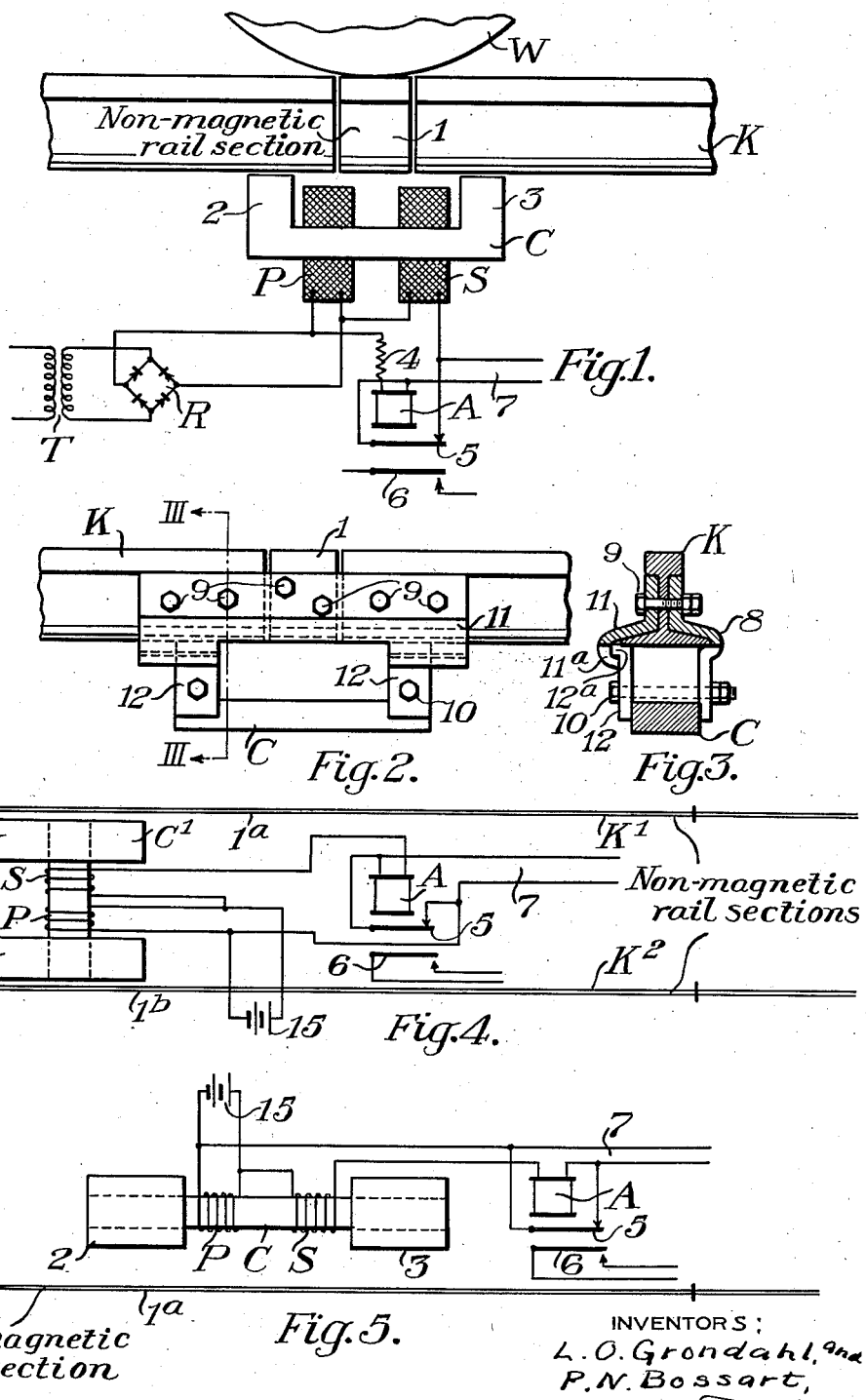

1,798,256

UNITED STATES PATENT OFFICE

LARS O. GRONDAHL, OF PITTSBURGH, AND PAUL N. BOSSART, OF SWISSVALE, PENNSYLVANIA, ASSIGNORS TO THE UNION SWITCH & SIGNAL COMPANY, OF SWISSVALE, PENNSYLVANIA, A CORPORATION OF PENNSYLVANIA

APPARATUS RESPONSIVE TO THE PASSAGE OF RAILWAY VEHICLES

Application filed March 18, 1930. Serial No. 436,758.

Our invention relates to apparatus responsive to the passage of railway vehicles, and has for an object the provision of apparatus of this character controlled inductively by a part of the vehicle itself, thereby avoiding the necessity for track circuits or mechanical cooperation between a part of the vehicle and a part on the track. Apparatus embodying our invention is particularly well adapted for the control of highway crossing signals, but is not limited to this specific use.

We will describe a few forms of apparatus embodying our invention, and will then point out the novel features thereof in claims.

In the accompanying drawing, Fig. 1 is a view showing in side elevation one form of apparatus embodying our invention. Fig. 2 is a view similar to Fig. 1 but showing one means for securing certain parts of the apparatus together. Fig. 3 is a sectional view on the line III—III of Fig. 2. Fig. 4 is a plan view showing a modified form of apparatus embodying our invention. Fig. 5 is a plan view showing still another modified form of apparatus embodying our invention.

Similar reference characters refer to similar parts in each of the views.

Referring first to Fig. 1, the reference character K designates a track rail, and the reference character W represents a vehicle wheel rolling on this rail. The rail K is provided with a short section 1 of non-magnetizable material, such, for example, as manganese steel. A U-shaped core C is located underneath the rail K, and so positoned that its poles 2 and 3 are in contact with the track rail on opposite sides of the non-magnetizable section 1. It follows that when a wheel W passes over the section 1, the magnetic reluctance of the core C will first be decreased below its normal value, and will then return to its normal value as the wheel recedes. We take advantage of these changes in the reluctance of the core C to control a relay A.

The core C is provided with a primary winding P and a secondary winding S. The primary winding P is connected with the output terminals of a rectifier R, the input terminals of which are connected with the secondary of a tranformer T. The primary of this transformer is constantly supplied with alternating current from a source that is not shown in the drawing. It follows that the primary winding P is constantly supplied with direct current. The secondary winding S is also connected with the output terminals of rectifier R through the winding of the relay A and a front contact 5 of this relay. The complete circuit is from the right-hand terminal of rectifier R, through the secondary winding S front contact 5 of relay A, winding of relay A, and a resistance 4 to the left-hand output terminal of rectifier R. The current flowing in this circuit, under normal conditions, that is, in the absence of the influence of a vehicle wheel, is sufficient to keep relay A energized. When a wheel W passes over the short section 1, however, the change in the reluctance of the core C causes a cycle of alternating current to be produced in the secondary winding S and, consequently, in the winding of relay A, one-half of which cycle opposes the direct current normally flowing in relay A, and which therefore causes this relay to open. So far as the circuits illustrated in the drawing are concerned, relay A will then remain open, but it may be closed by closing a shunt around contact 5, and this shunt may be controlled by any suitable means having nothing to do with our present invention. We have illustrated a branch path 7 which may lead to the shunting contact.

Obviously, the primary and secondary windings P and S, as well as relay A, could be energized from a battery, as they are in Figs. 4 and 5.

It is, of course, necessary to provide suitable means for bolting the short rail section 1 to the main track rail, and for also securing the core C to the rail. One means for accomplishing this is shown in Figs. 2 and 3, wherein a fish plate 8 of non-magnetizable material is located on one side of the rail K and is bolted to the short section 1 as well as to the rail K on both sides of this section. This fish plate has a portion extending downwardly over the base of the rail to engage one side of the core C. Located on the other side of the track rail is a fish plate 11, likewise of non-magnetizable material, which is bolted to the short section 1 as well as to the rail K on each side of this section. The two fish plates 8 and 11 may be attached to the rail by a single series of bolts 9. On the right-hand side of the core C, as viewed in Fig. 3, is a plate 12 of non-magnetizable material which is bolted to the core by the bolts 10 which hold the fish plate 8. The upper edge of the plate 12 is provided with a flange $12^a$, and the lower edge of the fish plate 11 is provided with a lip $11^a$ cooperating with the underside of the flange $12^a$, so that the fish plate and the lower plate are interlocked. This construction makes it possible to remove the core C without disturbing the track rail or the short rail section 1, this removal being accomplished by merely withdrawing the bolts 10.

Referring now to Fig. 4, the two track rails $K^1$ and $K^2$ are provided with non-magnetizable sections $1^a$ and $1^b$, respectively, and the magnetizable core, which is here designated $C^1$, extends transversely across the rails with its poles 13 and 14 adjacent the two rail sections $1^a$ and $1^b$, respectively. The apparatus associated with the core $C^1$ is the same as in Fig. 1, except that a battery 15 is used in place of the transformer and rectifier shown in the preceding view. With the apparatus shown in Fig. 4 the reluctance of the core $C^1$ is decreased when a vehicle truck passes over this core, and so the apparatus responds to the passage of the truck as distinguished from the passage of a wheel in Fig. 1.

Referring now to Fig. 5, the reference character $1^a$ designates a non-magnetizable rail section which is considerably longer than the section 1 of Fig. 1. The magnetizable core C is positioned so that its two poles 2 and 3 are both adjacent the non-magnetizable rail section $1^a$. The apparatus associated with this core is the same as that shown in the preceding views, and the operation will be readily understood from the explanations given hereinbefore. It is sufficient to say that as a truck passes over the rail section $1^a$ it will first decrease the reluctance of the core C below its normal value, whereupon the reluctance will again return to its normal value as the truck recedes from the section, the result being that relay A opens in response to one-half of the alternating current cycle which is produced in secondary winding S.

Although we have herein shown and described only a few forms of apparatus embodying our invention, it is understood that various changes and modifications may be made therein within the scope of the appended claims without departing from the spirit and scope of our invention.

Having thus described our invention, what we claim is:

1. Apparatus responsive to the passage of a railway vehicle, comprising a track rail provided with a short section of non-magnetizable material, a magnetizable core having its poles adjacent the rail on opposite sides of said section, a primary and a secondary winding on said core, a circuit for said primary winding including a source of direct current, and a circuit for said secondary winding including said source and a relay, said circuits being so adjusted that one-half of the alternating current cycle produced in the secondary winding due to the changes in the reluctance of said core caused by a passing vehicle wheel opposes the current supplied to said relay by said source and so causes the relay to open.

2. Apparatus responsive to the passage of a railway vehicle, comprising a section of non-magnetizable material in one of the track rails, a magnetizable core having both of its poles adjacent said rail section, a primary and a secondary winding on said core, a circuit for said primary winding including a source of direct current, and a circuit for said secondary winding including said source and a relay, said circuits being so adjusted that one-half of the alternating current cycle produced in the secondary winding due to the changes in the reluctance of said core caused by a passing vehicle wheel opposes the current supplied to said relay by said source and so causes the relay to open.

3. Apparatus responsive to the passage of a railway vehicle, comprising a track section of non-magnetizable material, a magnetizable core having its poles adjacent said rail section, a primary and a secondary winding on said core, a circuit for said primary winding including a source of direct current and a circuit for said secondary winding including said source and a relay, said circuits being so adjusted that when a vehicle passes over said rail section one-half of the cycle of alteranting current produced in said secondary winding due to the changes of the reluctance of said core opposes the current supplied to said relay by said source and so causes the relay to open.

4. Apparatus responsive to the passage of a railway vehicle, comprising a section of non-magnetizable material in one of the track rails, a magnetizable core having both of its poles adjacent said rail section, a primary and a secondary winding on said core, a circuit for said primary winding including a source of direct current, and a circuit for said secondary winding including said source and a relay, said circuits being so adjusted that when a vehicle passes over said rail section one-half of the cycle of alternating current produced in said secondary winding due to the changes of the reluctance of said core opposes the current supplied to said relay by said source and so causes the relay to open.

5. Apparatus responsive to the passage of a railway vehicle, comprising a magnetizable core positioned in the trackway to have its reluctance decreased by a ferro-magnetic part of a passing vehicle, a primary and a secondary winding on said core, a circuit for said primary winding including a source of direct current, and a circuit for said secondary winding including said source and a normally energized relay, said circuits being so adjusted that one-half of the alternating current cycle produced in the secondary winding due to the changes in the reluctance of the core caused by a passing vehicle opposes the current supplied to said relay by said source and so causes the relay to open.

6. Apparatus responsive to the passage of a railway vehicle, comprising two oppositely disposed sections of non-magnetizable material in the two track rails respectively, a magnetizable core having its poles adjacent said two rail sections respectively, a primary and a secondary winding on said core, a circuit for said primary winding including a source of direct current, and a circuit for said secondary winding including said source and a relay, said circuits being so adjusted that when a vehicle passes over said rail section one-half of the cycle of alternating current produced in said secondary winding due to the changes of the reluctance of said core opposes the current supplied to said relay by said source and so causes the relay to open.

In testimony whereof we affix our signatures.

LARS O. GRONDAHL.
PAUL N. BOSSART.